United States Patent [19]

Pollet et al.

[11] Patent Number: 4,539,364

[45] Date of Patent: Sep. 3, 1985

[54] HOT MELT SIZES

[75] Inventors: Jean-Claude Pollet; Martin C. Flautt, both of Granville; Gordon P. Armstrong, Newark, all of Ohio

[73] Assignee: Owens-Corning Fiberglas Corporation, Toledo, Ohio

[21] Appl. No.: 614,362

[22] Filed: May 29, 1984

[51] Int. Cl.³ .............................................. C08L 91/08
[52] U.S. Cl. .................................... 524/488; 524/489; 524/505; 525/98
[58] Field of Search ........................ 524/488, 489, 505; 525/98

[56] References Cited

U.S. PATENT DOCUMENTS 4,432,607  2/1984  Levy ..................................... 427/163
4,492,428  1/1985  Levy ..................................... 524/505

Primary Examiner—Melvyn I. Marquis
Attorney, Agent, or Firm—Ronald C. Hudgens; Greg Dziegielewski; Patrick P. Pacella

[57] ABSTRACT

A non-aqueous hot melt coating composition consisting of a thermoplastic rubber block copolymer, a polyethylene wax and a low molecular weight resin compatible with the end styrenic block of the rubber block copolymer is useful as a hot melt size.

10 Claims, No Drawings

HOT MELT SIZES

TECHNICAL FIELD

This invention pertains to hot melt sizes.

In one of its more specific aspects, this invention pertains to hot melt sizes for glass fibers.

BACKGROUND OF THE INVENTION

The use of sizes on glass fibers is well known. Sizes are applied to the surface of glass fibers for several reasons. While sizes are usually applied to the fibers for the purpose of protecting the fibers during processing immediately subsequent to their formation, sizes can also have incorporated into their compositions certain components which impart properties which facilitate their usage. Among these can be such properties as improving strand integrity, impact strength, toughness, elongation at break and, of equal importance, improving the adherence between the glass fiber and the matrix into which the glass fibers or strands may be incorporated for reinforcement purposes.

Relatedly, if the size can be applied to the fibers in some form other than an aqueous solution, in which form most sizes are applied, there can be avoided considerable drying costs and strand discoloration as the size tends to migrate outwardly through the package into which the fibers are wound.

The hot melt sizes of this invention meet these requirements.

STATEMENT OF INVENTION

According to this invention, there is provided a non-aqueous hot melt coating composition consisting of a thermoplastic rubber block copolymer, a polyethylene wax and a low molecular weight resin compatible with the end block of the rubber block copolymer.

Also, according to this invention, there is provided a glass fiber coated with the above-defined composition and a resin reinforced with the coated glass fiber.

DESCRIPTION OF THE INVENTION

The invention is employable with any glass conventionally employed as reinforcement of resins including glass fibers of short and continuous lengths.

Similarly, the glass can be employed to reinforce any resins including polyolefins, polyesters, styrene-based resins and the like. It is particularly suitable for reinforcing styrenic thermoplastics.

The hot melt size of this invention is a 100 percent solids formulation applied as a hot melt to the glass fibers as they are formed, that is, at the place in their formation at which aqueous sizes are conventionally applied, that is, between the bushing and the collet on which the fibers are wound as a package.

The hot melt size will consist of from about 10 to about 35 weight percent of a thermoplastic, block copolymer rubber comprising a styrenic monomer in the block forming the glassy phase of the thermoplastic rubber. The block copolymer can be a di-block or, preferably, a tri-block copolymer of the type S-R-S wherein S represents a styrenic block and R represents a rubbery block. R can be, for example, a polyisoprene, a polybutadiene or an ethylene-butylene block.

In the preferred embodiment of the invention, the rubber block copolymer will be employed in an amount within the range of from about 10 to about 35 weight percent, preferably in an amount within the range of from about 20 to about 30 weight percent. The most preferred amount is within the range of from about 22 to about 25 weight percent.

An example of a suitable thermoplastic, block copolymer is Kraton ®B1652-1000-0, available from Shell Chemical Co. This material is a mixture containing styrene-ethylene/butylene-styrene block copolymers plus a minor amount of an antioxidant/stabilizer. This material has a styrene to rubber weight ratio of 29 to 71.

Any suitable low molecular weight polyethylene wax can be employed. Preferably, the wax will be a microcrystalline wax having a melting point (ASTM D-127) of about 199° F., a penetration (ASTM D-1321 at 77° F.) to about 0.5 mm, a viscosity at 210° F. (ASTM D-88 SUS) of about 78 and a specific gravity (75° F.) of 0.93.

In the preferred embodiment, the microcrystalline wax will be employed in an amount within the range of from about 30 to about 80 weight percent, preferably in an amount within the range of from about 40 to about 65 weight percent and, most preferably, in an amount within the range of from about 55 to about 58 weight percent.

One particularly suitable microcrystalline wax is Petrolite ®C-1035 available from Bareco, a Division of Petrolite Corp., Tulsa, Okla.

Any suitable low molecular weight resin compatible with the end styrenic block of the rubber block copolymer can be employed. Preferably, the resin will be a hydrogenated styrene/methyl styrene copolymer having a weight average molecular weight of about 1000, a melt viscosity of 1 poise at 209° C. and a glass transition temperature of about 65° C.

This resin will be contained in the composition in an amount within the range of from about 5 to about 50 weight percent, preferably in an amount within the range of from about 10 to about 40 weight percent and, most preferably, in an amount of about 20 weight percent.

One particularly suitable hydrocarbon low molecular weight resin is Regalrez Resin 1126 available from Hercules Incorporated.

In other embodiments of the invention, the composition can comprise silane coupling agents, stabilizers, dyes, wetting agents and the like.

In the preferred embodiments of the invention, various of the aforesaid embodiments will have melt viscosities within the range of from about 430 to about 750 cp., as shown by the following.

|  | Composition | | |
| --- | --- | --- | --- |
|  | 1 | 2 | 3 |
| Component, PBW/100 P | | | |
| Block Copolymer | 22 | 25 | 25 |
| Wax | 58 | 55 | 55 |
| Resin | 20 | 20 | 20 |
| Silane | 0 | 0 | 2 |
| Property | | | |
| Melt Viscosity at 400° F., cp. | 430 | 750 | 560 |

The materials of this composition can be mixed in any suitable manner. Preferably, each will be heated until liquid and the liquids mixed at a temperature above their solidification points.

The hot melt size is applied to the glass fibers in the molten state, preferably employing a heated applicator. The applicator and the hot melt temperature should both be at a sufficiently high temperature to achieve an even, uniform coating on the strand.

The coated strand is then cooled so that the size has attained a non-adhesive consistency by the time the coated strand reaches the glass pulling device, usually a collet, or an in-line chopper.

It will be evident from the foregoing that various modifications can be made to this invention. Such, however, are considered within the scope of the invention.

We claim:

1. A non-aqueous hot melt coating composition consisting of a thermoplastic rubber block copolymer, a polyethylene wax and a low molecular weight resin compatible with the end block of the rubber block copolymer, wherein said composition is a 100 percent solids formulation containing said polyethylene wax in an amount within the range of from about 30 to about 80 weight percent.

2. The composition of claim 1 in which said block copolymer is a di-block or tri-block copolymer of the type S-R-S wherein S represents a styrenic block and R represents a rubbery block comprising a polyisoprene block, a polybutadiene block or an ethylene-butylene block.

3. The composition of claim 1 in which said polyethylene wax is a low molecular weight polethylene microcrystalline wax having a melting point of about 199° F.

4. The composition of claim 1 in which said low molecular weight resin is a hydrogenated styrene/methyl styrene copolymer having a weight average molecular weight of about 1000.

5. The composition of claim 1 in which said composition is a 100 percent solids formulation containing said thermoplastic rubber block copolymer in an amount within the range of from about 10 to about 35 weight percent, and said low molecular weight resin in an amount within the range of from about 5 to about 50 weight percent.

6. The composition of claim 1 in which said composition is a 100 percent solids formulation containing said thermoplastic rubber block copolymer in an amount within the range of from about 20 to about 30 weight percent, said polyethylene wax in an amount within the range of from about 40 to about 65 weight percent and said low molecular weight resin in an amount within the range of from about 10 to about 40 weight percent.

7. The composition of claim 1 in which said composition is a 100 percent solids formulation containing said thermoplastic rubber block copolymer in an amount within the range of from about 22 to about 25 weight percent, said polyethylene wax in an amount within the range of from about 55 to 58 weight percent and said low molecular weight resin in an amount of about 20 weight percent.

8. The composition of claim 1 having a melt viscosity within the range of from about 430 to about 750 cp. at 400° F.

9. A glass fiber having on its surface the coating defined in claim 1.

10. A resin having incorporated therein the glass fiber defined in claim 9.

* * * * *